US 6,424,771 B1

(12) United States Patent
Sheu

(10) Patent No.: US 6,424,771 B1
(45) Date of Patent: Jul. 23, 2002

(54) OPTICAL CABLE FIBER PROVIDED WITH A NON-MIGRATING ANTIOXIDANT

(75) Inventor: Jim Jenqtsong Sheu, Dunwoody, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/510,130

(22) Filed: Feb. 21, 2000

(51) Int. Cl.$^7$ .............................. G02B 6/44; C08K 5/38
(52) U.S. Cl. ..................... 385/109; 385/102; 385/114; 523/173
(58) Field of Search .................. 385/100–114; 523/173; 524/202, 203, 255, 257

(56) References Cited

U.S. PATENT DOCUMENTS

| | | | |
|---|---|---|---|
| 4,701,016 A | 10/1987 | Gartside, III et al. | 350/96.23 |
| 4,867,526 A | 9/1989 | Arroyo | 350/96.23 |
| 4,900,126 A | 2/1990 | Jackson et al. | 350/46.23 |
| 5,187,763 A | 2/1993 | Tu | 385/100 |
| 5,285,513 A | 2/1994 | Kaufman et al. | 385/109 |
| 5,433,872 A | * 7/1995 | Brauer et al. | 385/100 |
| 6,080,929 A | * 6/2000 | Fagouri et al. | 177/23 C |
| 6,085,009 A | * 7/2000 | Risch et al. | 385/109 |

* cited by examiner

Primary Examiner—Hemang Sanghavi
(74) Attorney, Agent, or Firm—Thomas, Kayden, Horstemeyer & Risley, LLP

(57) ABSTRACT

A cable of this invention includes a core comprising a plurality of coated optical fibers and a filling composition of matter that is disposed about the fibers. Typically, the fibers and the filling material are disposed within a tubular member that is disposed within a sheath system. The sheath system includes longitudinally extending strength members and a plastic jacket. The filling composition that fills interstices in the core is one that includes an oil constituent that is a relatively high molecular weight aliphatic hydrocarbon. A relatively small percent by weight of a stereochemically hindered antioxidant system is used to prevent thermal oxidative degradation of the filling material as well as of materials in contact with the filling material. Such stereochemically hindered antioxidants will not migrate out of filling material into other cable and fiber materials, thereby increasing their effectiveness. As a result, a relatively low concentration of antioxidant is needed, as compared with the amount used in the prior art. A styrene ethylene propylene copolymer is also included in order to reduce oil separation of the filling material. A colloidal filler is used to impart gel properties to the material.

7 Claims, 4 Drawing Sheets

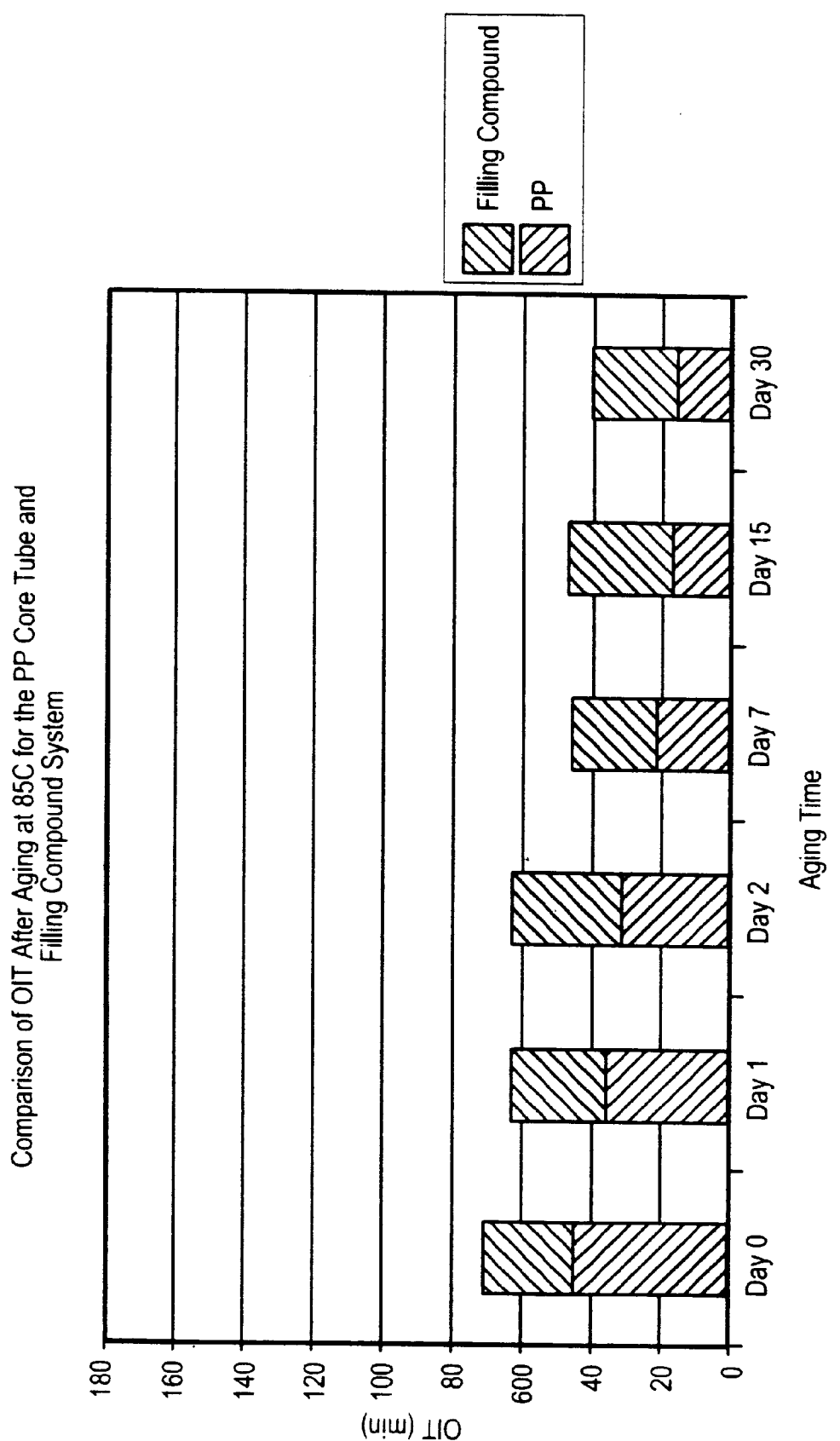

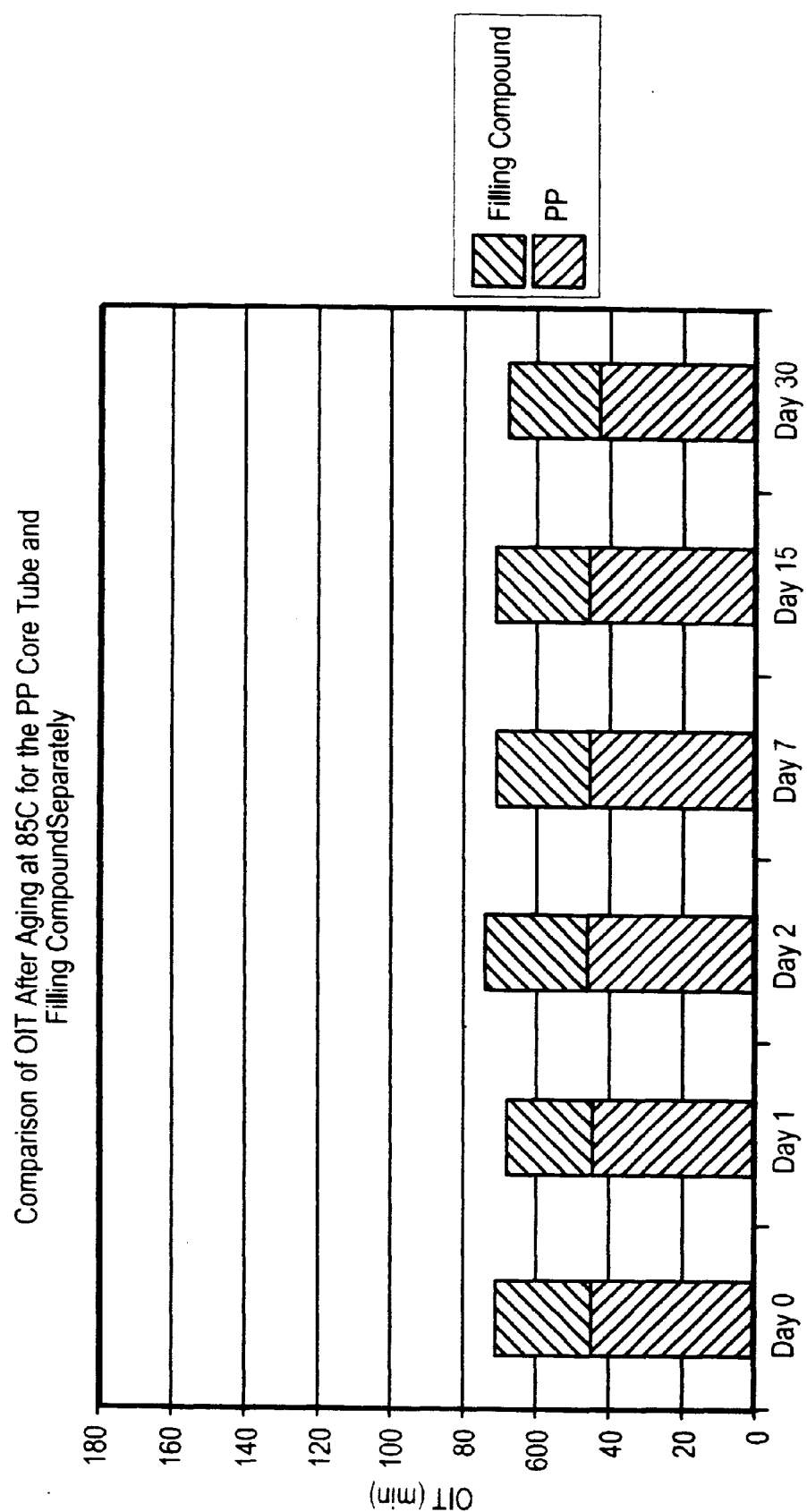

OPTICAL CABLE FIBER PROVIDED WITH A NON-MIGRATING ANTIOXIDANT

TECHNICAL FIELD

This invention relates to an optical fiber cable provided with a stabilized waterblocking material. More particularly, the invention relates to a cable provided with a dripless, non-bleeding, optical fiber coating-compatible and stabilized waterblocking material that fills interstices in a core of the cable.

BACKGROUND OF THE INVENTION

In the cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of a metallic conductor cable.

Optical fiber cables have made great inroads into the communications cable market. Although the presence of water itself within an optical fiber cable is not necessarily detrimental to its performance, passage of the water along the cable interior to connection points or terminals or associated equipment inside closures, for example, may cause problems. In both cases, under freezing conditions, the performance of optical fiber deteriorates quickly.

Furthermore, water may enter the cable because of damage to the cable that compromises its integrity. For example, rodent attacks or mechanical impacts may cause openings in the sheath system of the cable to occur, allowing water to enter, and, if not controlled, to move longitudinally along the cable into splice closures.

In the prior art, various techniques have been used to prevent the ingress of water through the sheath system of a cable and along the core. For example, a metallic shield, which often times is used to protect a metallic conductor cable against lightning and rodent attacks, is provided. However, the forming of a shield about a cable core requires the use of relatively low manufacturing line speeds. Also, the use of a metallic shield is destructive of the otherwise all-dielectric property of an optical fiber cable. Further, lightning strikes may cause holes in a metallic shield.

It is common to include provisions in addition to or as an alternative to a metallic shield for preventing the ingress of water into the core. Waterblocking materials have been used to fill cable cores and to coat portions of cable sheath systems to prevent the movement longitudinally thereof of any water which enters the cable. Such a material typically is referred to as a filling material. In optical fiber cables, a further important function of a filling material is the maintenance of the optical fibers in a low stress state.

As taught in the prior art, U.S. Pat. No. 5,187,763, issued to C. F. Tu, a cable filling material, especially an optical fiber cable filling material, should meet a variety of requirements. Among them is the requirement that the physical properties of the cable remain within acceptable limits over a rather wide temperature range, e.g., from about −40° to about 76° C. It is desirable that the composition of matter of the filling material be substantially free of syneresis, i.e., have an ability to retain uniform consistency over the temperature range. Generally, syneresis is controlled by assuring dispersion of an adequate amount of colloidal particles or other gelling agent. Other desirable properties of the compositions include thermal oxidation resistance.

Suitable waterblocking materials in use must yield under strains experienced when the cable is made or handled. Otherwise, movement of the optical fibers within the cable would be prevented and the fibers would buckle because they contact, with a relative small periodicity, a surface of the unyielding filling material. The smaller the periodicity of the fibers when contacting such an unyielding surface, the greater becomes a loss that is referred to as microbending loss.

Typically, microbending loss in optical fiber cables is more difficult to control at long wavelengths than at short ones. Thus, the requirements on the mechanical properties of a fiber cable filling material are typically substantially more severe for cable that is to be used at 1.55 $\mu$m, for example, than they are if the cable is to be used at shorter operating wavelengths of 1.3 $\mu$m, for example. Although, it has been found that some prior art filling materials perform quite satisfactorily at wavelengths up to about 1.3 $\mu$m, it has also been found that this is often not the case at longer wavelengths.

Because silica-based optical fibers typically have their lowest losses at or near the 1.55 $\mu$m wavelength, there is great interest in operating optical fiber telecommunication systems at approximately that wavelength. Thus, it is important to have available filling compositions for optical fiber cable that has no significant cabling-induced losses at long wavelengths, including about 1.55 $\mu$m.

Filling compositions for use in optical fiber cables should have a relatively low shear modulus, $G_e$. However, it has been determined that, at least for some applications, a low value of $G_e$ of the filling material is not sufficient to assure low cabling loss, and that a further parameter, the critical yield stress, $\sigma_c$, needs to be controlled because it also affects the optical performance of fibers in a cable with a filling material.

Oil separation is a property of a grease-like material, which describes the tendency of the material to bleed oil during its lifetime. What is desired is a filling material which has an oil separation no greater than 5% when centrifuged at a rotational speed equivalent to a relative centrifugal force of about 26,000 G for two hours.

Incorporating a block copolymer into the grease-like composition of matter allows a reduction of the amount of colloidal particles that has been added to the mixture to prevent syneresis of the gel. This reduction can result in cost savings. Furthermore, it makes possible the formulation of less bleeding compositions having a very low critical yield stress.

Waterproofing filling materials for use in cables also must pass industry standard drip tests. To pass these tests, filling materials in cable cores must be retained as cable samples, suspended vertically, and subjected to specified elevated temperatures. Some prior art materials, which have been used, perform satisfactorily with respect to microbending and associated losses, but they bleed out excessively and have problems in meeting current drip tests. Also, it is desired that the low mean added losses exhibited by some prior art filling materials, at least be met by filling materials which pass the drip test and have suitable low temperature properties.

The viscosity of the sought-after filling material also is important with respect to processing. Because cable drip is related to oil separation, constraints on the sought-after filling material include oil separation, critical yield stress and viscosity. These constraints usually are antagonistic to each other. For example, a reduction of oil separation and an increase in cable drip temperature require high viscosity and yield stress whereas to facilitate processing and to reduce optical loss requires low viscosity and yield stress.

Another problem relating to filled optical fiber cables is the compatibility of the filling material with some coating materials, which are disposed about drawn optical fiber to protect the optical fiber. If compatibility is lacking, the performance and/or the appearance of the optical fiber could be affected adversely. The compatibility of otherwise suitable prior art filling materials with some coating materials, particularly those which are relatively soft, is something less than desired.

The filling composition of matter is one which includes an oil constituent, and which is a relatively high molecular weight aliphatic hydrocarbon. The aliphatic hydrocarbon constituent may be a mineral oil or synthetic oil such as polyalphaolefin, for example. Relatively low pour point oils are used in order to improve optical loss at low temperatures. Prior art filling materials have used a relatively large percent by weight of an antioxidant system to prevent thermal oxidative degradation of the filling material as well as of materials in contact with the filling material.

Although the above-mentioned composition is suitable from many standpoints for ease in waterblocking in an optical fiber cable, there is a desire to improve cost and performance of the composition. Antioxidants in the prior art filling material have tended to migrate through the core or buffer tube jacket, thus decreasing its ability to block moisture and cushion and center the optical fibers. This happens in spite of a relatively high concentration of antioxidants are used in the prior art materials, which, of course, tend to increase the overall cost of the filling materials.

What is sought after is a waterblocking composition that has a stable antioxidant system in relatively low concentration, lower cost and improved performance over those used in the past. More particularly, antioxidants that will not migrate to other cable materials may not only give improved performance but also may provide synergistic properties.

SUMMARY OF THE INVENTION

The foregoing performance problems of the prior art have been improved by a cable of this invention having an improved filling composition of matter disposed in a core thereof. A cable of this invention includes a core comprising a plurality of coated optical fibers and a filling composition of matter that is disposed about the fibers. Typically, the fibers and the filling material are disposed within a tubular member that is disposed within a sheath system. The sheath system includes longitudinally extending strength members and a plastic outer jacket.

The filling composition that fills interstices in the core is one that includes an oil constituent that is a relatively high molecular weight aliphatic hydrocarbon. The aliphatic hydrocarbon is a mineral oil or synthetic oil such as polyalphaolefin. A non-migrating antioxidant system is used to prevent thermal oxidative degradation of the filling material as well as of materials in contact with the filling material. Advantageously, for stabilization and metal deactivation, the composition includes Ethanox 330™. A styrene-ethylene propylene copolymer is included in order to reduce oil separation of the filling material. A fumed alumina or fumed silica is also used to impart gel properties to the material, as described in U.S. patent application, Ser. No. 09/510,131, filed concurrently herewith by Jim Sheu, entitled "Filling Compound Having Alumina Gelling Agent" (60104-1130), which is incorpoated herein by reference.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which:

FIG. 5 is a bar graph of a comparison of the oxidation-induction time (OIT) after aging at 85° C. for the polypropylene core tube and filling compound together, tested as a system.

FIG. 6 is a bar graph of the comparison of OIT after aging at 85° C. for the polypropylene core tube and filling compound separately.

DETAILED DESCRIPTION OF THE INVENTION

Figures 1, 2:
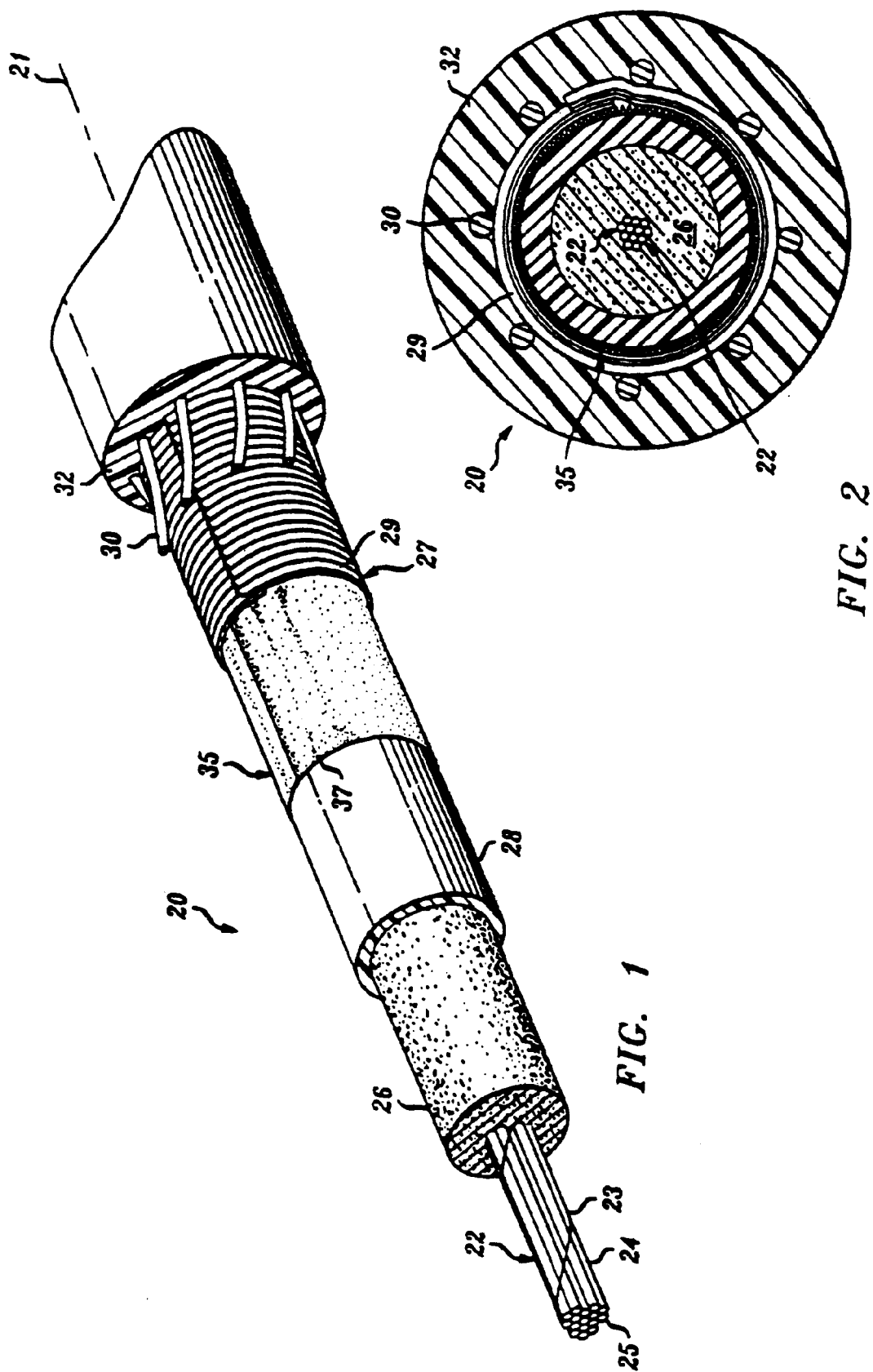
FIG. 1 is a perspective view of an optical fiber cable of this invention which has a core within which disposed a filling material.
FIG. 2 is an end view in section of the cable of FIG. 1.

Referring now to FIGS. 1 and 2, there is shown a communications cable which may incorporate the improved filling material of the present invention, the cable being designated generally by the numeral 20 and having a longitudinal axis 21. It includes a core 22 comprising optical fibers 25–25 which may be arranged in one or more units 24–24. Each of the optical fibers is provided with a protective coating system that typically includes an inner primary coating layer and an outer secondary coating layer. Also, each of the coated fibers may be buffered with an outer layer of polyvinyl chloride (PVC), for example. Each of the units 24—24 may be wrapped with a binder ribbon 23. The core 22 includes a waterblocking material 26 that is disposed within a tubular member 28 of a sheath system 27. The tubular member 28 often is referred to as a core tube.

The tubular member 28 may be enclosed by a metallic shield 29 and an outer plastic jacket 32. The sheath system 27 also may include strength members 30—30. Also, a waterblocking tape 35 may be wrapped about an outer surface of the core tube 28. The tape 35 may be a waterblocking tape that is disclosed, for example, in U.S. Pat. No. 4,867,526 which issued on Sep. 19, 1989, to C. J. Arroyo. Also, the filling material 26 may be used to fill the core of a cable that includes optical fiber ribbons such as those disclosed in U.S. Pat. No. 4,900,176, which issued on Feb. 13, 1990, to K. W. Jackson, et al.

Constraints on the sought after filling material which includes an oil constituent include oil separation, and associated cable drip temperature, critical yield stress and viscosity of the filling material. As mentioned hereinbefore, these constraints usually are antagonistic to each other. Previously, it has been demonstrated that low pour point oils produce filling materials, the critical yield stress of which at low temperatures decreases with decreasing pour point. The pour point of a material is the lowest temperature at which a sample of the material may be poured. Theoretically, the use of a low pour point oil is conducive to the reduction of optical loss at low temperatures. Cable construction and cable processing conditions also affect the optical performance of fibers and therefore, the benefit of a low pour point oil may become obscured.

The critical yield stress of a filling material is considered to affect the optical performance of fibers in a cable filled with the filling material. The prior art filling material typically has a critical yield stress of 0.0016 psi at room temperature and 0.0096 psi at −40° C. The critical yield stress of the filling material 26 should be such that it does not cause an increase in optical fiber loss over that of prior art filling materials at all temperatures.

The viscosity requirement is needed to accommodate processing, not cable performance. The viscosity of prior art filling material as measured by a helipath viscometer should be 15 to 45 units using spindle TB at room temperature. In order to assure the waterhead resistance of an optical fiber cable, it is preferred to have the helipath viscosity in excess of 28 units. It is desired that the viscosity of the filling material be in the vicinity of that of prior art filling materials so that presently available processing facilities can be used.

The composition of matter of the filling material 26 which is used to fill interstices in the core of the cable 20 and which meets the foregoing requirements includes an oil constituent system in the range of about 85 to about 92 percent by weight. A suitable oil constituent is a relatively high molecular weight aliphatic hydrocarbon. By relatively high in this description is meant a molecular weight in excess of about 500.

The aliphatic hydrocarbon constituent may be a relatively high molecular weight mineral oil such as Kaydol™ available from the Witco Corporation, for example. In the alternative, the aliphatic hydrocarbon constituent may be a synthetic oil such as polyalphaolefin oil, polypropene oil or polybutene oil for example. Mixtures of polyalphaolefin with mineral oils and polybutene oils also may be used. In a preferred embodiment, the composition includes about 86.7% by weight of a polyalphaolefin such as SHF 402™ oil available from the Mobil Corporation. The synthetic oil or mineral oil of the preferred embodiment is a hydrogenated oligomer of alpha-decene and has an average molecular weight of 1280. The viscosity of the oil at 100° C. is approximately 40 centistokes. It has a pour point of approximately −40° C.

The polyalphaolefin aliphatic hydrocarbon also may be one that is characterized by a viscosity in the range of about 10 to 60 centistokes at 100° C. Suitable polybutene oils have a viscosity in the range of 190 to 300 centistokes whereas a suitable mineral oil has a viscosity greater than 150 SUS that equates to about 35 centistokes. If it has a viscosity substantially greater than 10 centistokes, such as, for example, 40 centistokes, the filling material may become more compatible with the coated optical fiber.

Figure 3:
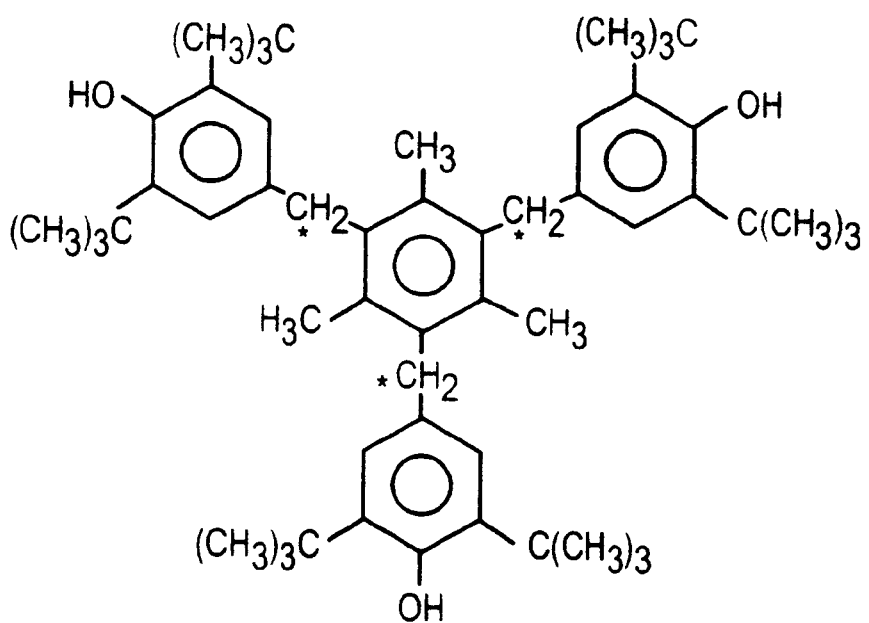
FIG. 3 depicts a stereochemically-hindered molecule, an antioxidant of the preferred embodiments, Ethanox 330.

Importantly, included in the composition of the filling material 26 in accordance with the present invention is an antioxidant system in the amount of about 0.01 to 10% by weight. For the purpose of illustration, the current examples use 2% by weight of antioxidant to compare with the antioxidant system in the prior art. The antioxidant of the preferred embodiment of this invention is stereochemically hindered from migrating through and out of the core tube. An example of such an antioxidant is 1,3,5-trimethyl-2,4,6-tris(3,5-di-tert-butyl-4-hydroxybenzyl) benzene and is shown in FIG. 3, where sterically-hindered means the hydrocarbon is a tertiary butyl (t-Bu) or phenyl group. The carbon in the center (*) is rigid and does not rotate as the other carbons do, due to three very bulky phenyl groups, and hence, contributes greatly to the stereochemical hindrance of the entire molecule. The antioxidant depicted in FIG. 3 is available commercially from Albemarle Corporation under the designation Ethanox 330™.

Figure 4:
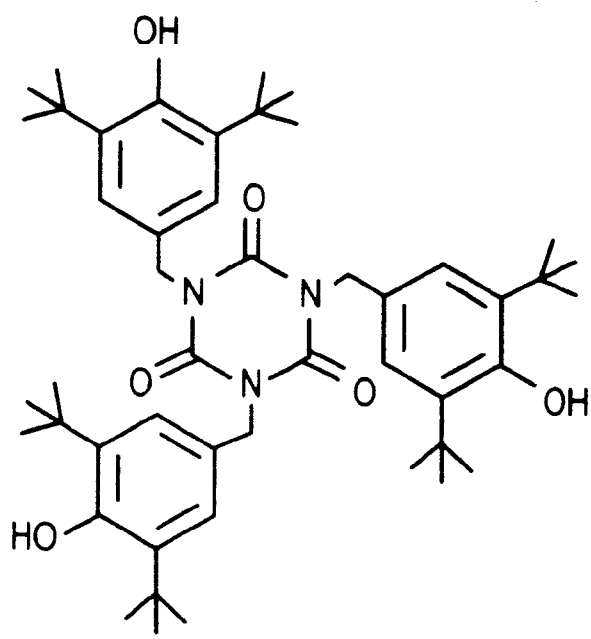
FIG. 4 depicts a stereochemically-hindered molecule, an antioxidant of the preferred embodiments, Ethanox 314.

Another antioxidant of the present invention is Ethanox 314™, or 3,5-tris(3,5-di-tert-butyl-4-hydroxybenzyl)-1,3,5-triazine-2,4,6-(1H,3H,5H)-trione, also available from Albemarle Corp. The chemical structure is depicted in FIG. 4. Similarly, the center section, 1,3,5-triazine-2,4,6-(1H,3H, 5H)-trione, is not flexible as other triazine triones without the substitutions of phenyl groupings on the nitrogen atoms. Sterically-hindered in this case means that the three very bulky phenyl groups contribute greatly to the stereochemical hindrance of the entire molecule.

Because these antioxidants are stereochemically bulky, a much lower weight percent of them is needed in the filling materials, usually in the range of 0.1 to 0.5%. Other stereochemically hindered antioxidants of the present invention are those antioxidant molecules or functions that are attached to polymers chemically, either covalently bonded or otherwise bonded.

A problem with prior art antioxidants is their migration out of the filling compound, and through the core tube. When the antioxidants have migrated out of the filling compound, their ability to inhibit the oxidation of the filling material, and thereby increase the life of the cable, is significantly reduced. Because the antioxidant of the prior art has the tendency to migrate from its position of use, a relatively large percentage of it has been required. The antioxidant of the present invention, however, does not migrate, and therefore, a smaller percentage of it can be used than has been used for antioxidants in the prior art.

Exemplary compositions of the prior art are shown in Table 1, with the constituents being given in percent by weight.

TABLE 1

Exemplary Compositions and OIT of Prior Art Filling Compound

| MATERIAL | DESIGNATION | PRIOR ART PERCENTAGE BY WEIGHT | SUPPLIER | OIT (min.) After Aging 30 Days |
| --- | --- | --- | --- | --- |
| | | Nominal | | 15.05 |
| Extender Oil | SHF 402 ™ | 86.5 | Mobil Chemical | |
| Rubber | Kraton G 1701 ™ | 6.0 | Shell Chemical | |
| Fumed Silica | Cab-O-Sil TS 720 ™ | 5.5 | Cabot Corp. | |

TABLE 1-continued

Exemplary Compositions and OIT of Prior Art Filling Compound

| MATERIAL | DESIGNATION | PRIOR ART PERCENTAGE BY WEIGHT | SUPPLIER | OIT (min.) After Aging 30 Days |
|---|---|---|---|---|
| Antioxidant | Irganox 1035 ™ | 0.3 | Ciba-Geigy | |
| Antioxidant | Irganox 1076 ™ | 1.7 | Ciba-Geigy | |

In general, the oxidative induction time (OIT) value is an indication of the time when the material being tested begins to oxidize. Therefore, the higher the OIT value, the slower the material begins to oxidize. In other words, an antioxidant system with a higher OIT would inhibit oxidation better than a system with a lower OIT value. The antioxidant system of the present invention improves the performance of the filling material. The oxidative induction time of the filling composition increases with the use of this antioxidant system.

The OIT may be determined by Differential Scanning Calorimetry (DSC). Specifically, a thermal analyzer equipped with differential scanning calorimetric cells manufactured by TA Instruments of New Castle, Del. (formerly known as E. I. DuPont Instruments) was used to measure the OIT values presented herein. Furthermore, as stated, the particular filling compound evaluated is presented in Tables 2 and 3.

TABLE 2

Comparable Filling Compound Composition and Properties of Present Invention

| | SHF 404 ™ | Kraton 1701 ™ | Ethanox 330 ™ | TS 720 ™ | Viscosity | OIT (min) |
|---|---|---|---|---|---|---|
| Filling Compound | 86.5 | 6 | 2 | 5.5 | 44.4 (TB) | 25.85 |

The filling compound (about 20 g) of the present invention that contains the antioxidant Ethanox 330™ was aged with Polypropylene (PP), Equistar PP 1602 WF™, in the form of a core tube (about 2 g). The filling compound was aged with the PP core tubes, as well as independently. The objective of this experiment was to determine how the antioxidant degrades and migrates over extended periods of time at 85° C. The degradation and migration of the antioxidant was measured by taking the OIT of different samples after different lengths of aging. Table 3 below summarizes the OIT for the core tube alone, the filling compound alone, and then with the combination of the core tube and filling compound system.

TABLE 3

OIT's in Minutes

| Day | PP Core Tube (CT) | Filling Compound (FC) | CT w/FC Measured OIT in CT | FC w/CT Measured OIT in FC |
|---|---|---|---|---|
| 0 | 43.98 | 25.85 | 43.98 | 25.85 |
| 1 | 42.99 | 24.86 | 35.15 | 27.86 |
| 2 | 45.07 | 28.41 | 31.01 | 31.08 |
| 7 | 44.52 | 25.76 | 20.64 | 24.81 |
| 15 | 44.13 | 26.57 | 16.38 | 29.88 |
| 30 | 41.47 | 25.55 | 15.05 | 24.2 |

FIG. 5 is a comparison of OIT after aging at 85° C. for both the PP core tube and filling compound system together.

FIG. 5 is a bar graph measuring OIT versus aging time in days. The lower portion of each bar represents the PP and the upper portion of each bar represents the filling compound. As shown in the graph, OIT for the filling compound aged with PP core tube stays at the same level throughout the testing period. It begins at 25.8 minutes on day 0 (beginning) and ends at 24.2 minutes on day 30, indicating that the antioxidant remains in the filling compound during the entire aging period. The antioxidant not only remains in the filling compound, but also keeps its effectiveness throughout the entire aging period.

In contrast, the OIT for the PP core tube (which uses conventional, prior art non-stereochemically hindered antioxidants) that is aged with filling compound decreases with increased time (aging). It begins at 43.98 minutes on day 0 and ends at 15.05 minutes on day 30. Conventionally, PP core tubes, like most PP in the market, use very low concentrations of conventional, prior art antioxidants, approximately 0.001 to 0.1% by weight. During the aging study of the filling compound, the antioxidants in the PP core tube gradually migrate into the filling compound. Therefore, the OIT for the PP core tube decreases quickly with time. Note that the maximum amount of antioxidant that may be present in the PP core tube is very small (2 g *0.1%=0.002 g), and negligible as compared with the amount of antioxidants that were already in the filling compound (20 g*2%=8 g) at the beginning of the experiment. The additional amount of antioxidants that the filling compound may be gaining from the PP core tube is negligible and does not have any impact on the OIT of the filling compound at all.

These series of experiments illustrate the point that a stereochemically hindered antioxidant will function effectively in the filling material in the way in which it is intended, and will not migrate out of the filling material.

FIG. 6 is a comparison of OIT after aging at 85° C. for the PP core tube and filling compound separately to serve as control samples. FIG. 6 is a bar graph of the OIT, in minutes, versus aging time, in days. The upper portion of each bar represents the filling compound, and the lower portion of each bar represents the PP core tube. As expected, the OIT for the PP core tube aged by itself stays relatively constant, from 43.98 minutes on day 0 (beginning) to 41.47 minutes on day 30. The conventional, prior art migrating antioxidants in the PP core tube that is aged by itself have no place to migrate and hence stay at a constant level The OIT for the filling compound aged by itself also stays relatively constant, as expected, from 25.85 minutes on day 0 (beginning) to 25.5 minutes on day 30.

It should be emphasized that the above-described embodiments of the present invention, particularly any "preferred" embodiments, are merely possible examples of implementation, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An optical fiber cable, which comprises:
   a core including at least one optical fiber transmission medium;
   a sheath system which is disposed about the core; and
   a filling composition of matter which is disposed about the transmission medium in the core, said composition of matter including
   a hydrocarbon,
   a block copolymer,
   a colloidal filler, and
   an antioxidant system which is sterochemically hindered from migrating out of the filling material, wherein the antioxidant system is composed of a combination of 1,3,5-trimethyl-2,4,6-tris(3,5-di-tert butyl-4-hydroxybenzyl) benzene and 1,3,5-tris(3,5-di-tert-butyl-4-hydroxybenzyl)-1,3,5-triazine-2,4,6-(1H,3H,5H)-trione.

2. The optical fiber cable of claim 1, wherein the antioxidant system comprises about 0.01 to 10 % by weight of the filling composition.

3. The optical fiber of claim 2, wherein said antioxidant is a polymer-linked or polymeric antioxidant.

4. The optical fiber of claim 2, wherein said hydrocarbon is aliphatic.

5. The optical fiber of claim 3, wherein said aliphatic hydrocarbon comprises a synthetic oil.

6. The optical fiber of claim 4, wherein said synthetic oil is selected from the group consisting of: polyalphaolefins, polybutenes, polypropenes, polyglycols, polyisobutylenes, ester oils and silicone fluids.

7. The optical fiber cable of claim 3, wherein said aliphatic hydrocarbon comprises a mineral oil.

* * * * *